April 11, 1939.  D. C. CLINE  2,154,376
VISCOSIMETER
Filed July 24, 1936  2 Sheets-Sheet 2
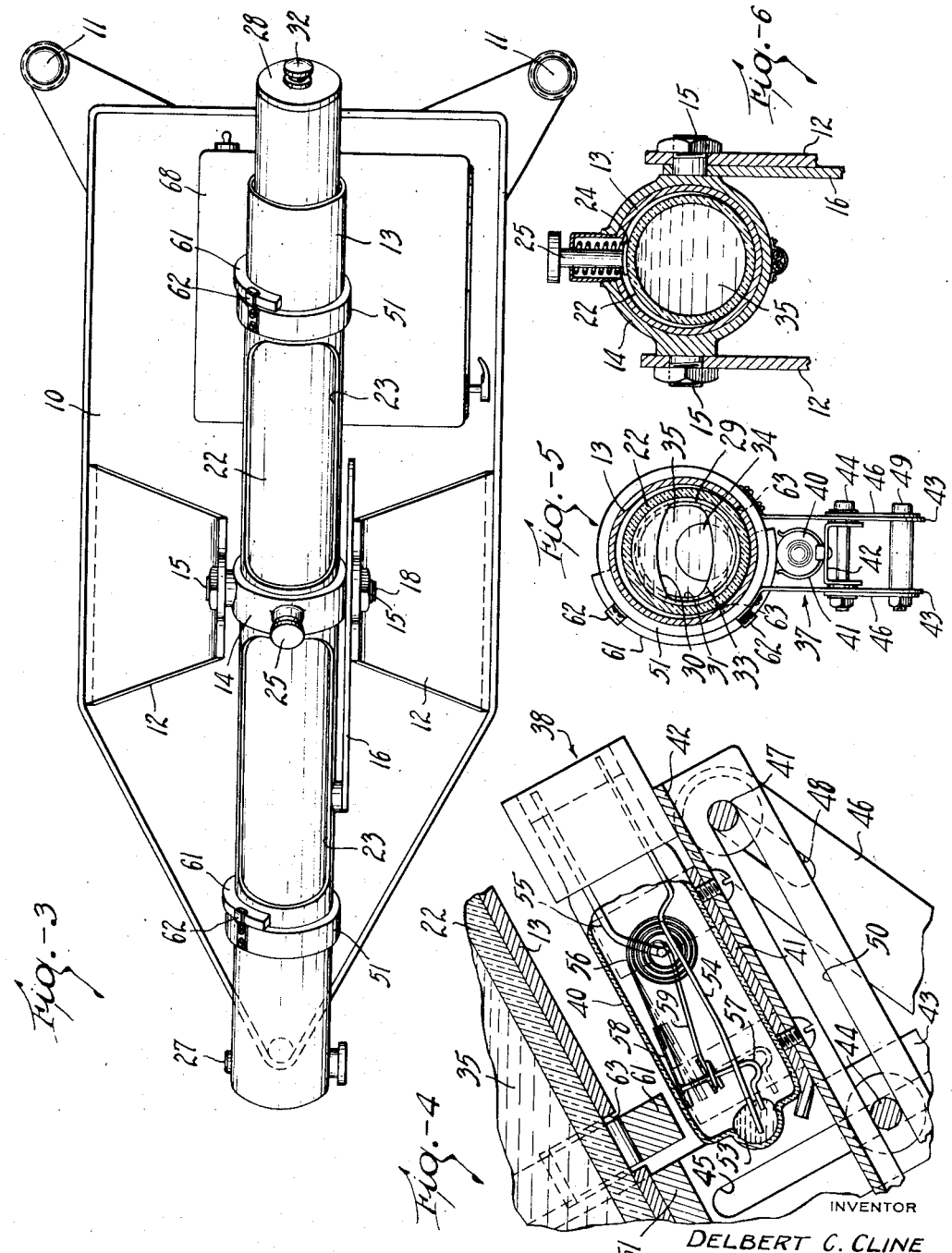
INVENTOR
DELBERT C. CLINE
BY
Albert P. Ely
ATTORNEY Patented Apr. 11, 1939

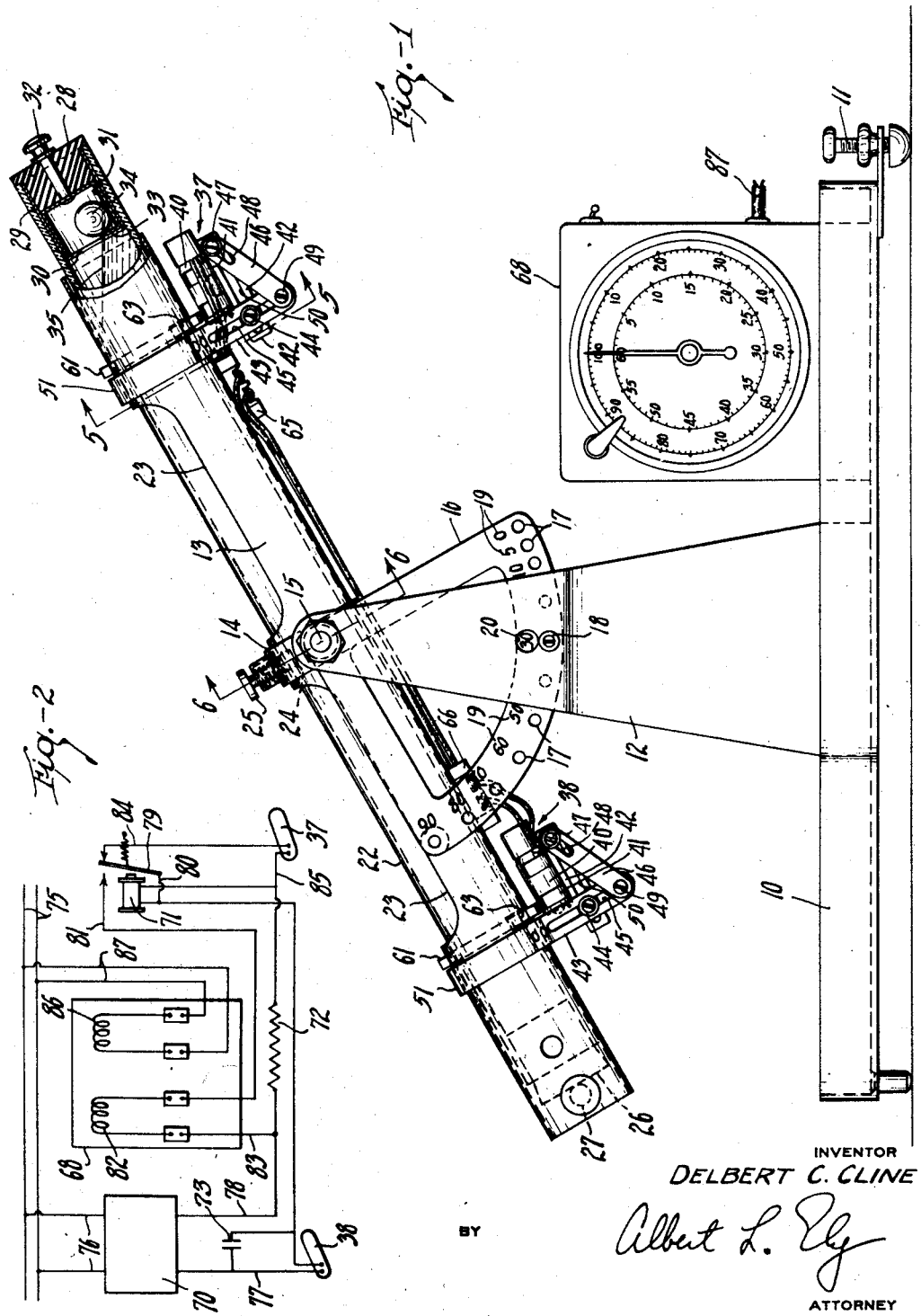

2,154,376

UNITED STATES PATENT OFFICE 2,154,376

VISCOSIMETER

Delbert C. Cline, Akron, Ohio, assignor to The Firestone Tire & Rubber Company, Akron, Ohio, a corporation of Ohio Application July 24, 1936, Serial No. 92,315

3 Claims. (Cl. 265—11)

This invention relates to viscosimeters such as are used for determining the relative viscosity of liquids or solutions, and more especially it relates to viscosimeters of the type wherein a gravity-impelled body is dropped through a column of liquid.

The chief objects of the invention are to provide an improved viscosimeter that is universally applicable for testing the viscosity of all liquids; to provide an instrument of the character mentioned that is not affected by temperature or temperature changes; that may be used with equal facility for the testing of hot or cold liquids; that is consistently accurate, and wherein there is no personal factor to affect the results obtained; to provide such an instrument that may be used with equal facility for testing opaque and transparent liquids; to provide simplicity of construction and ease of cleaning the test material from the instrument; to devise an instrument capable of testing volatile liquids without undue evaporation; and to provide an instrument wherein it is possible to make a series of tests, for the purpose of checking results, with the same column of liquid. Other objects will be manifest as the specification proceeds.

Of the accompanying drawings:

Figure 1 is a side elevation of a viscosimeter embodying the invention, in its preferred form;

Figure 2 is a wiring diagram of the electrical mechanism thereof;

Figure 3 is a plan view of the instrument shown in Figure 1;

Figure 4 is a vertical section, on a larger scale, of one of the magnetic switches of the device;

Figure 5 is a section on the line 5—5 of Figure 1; and

Figure 6 is a section on the line 6—6 of Figure 1.

Referring to the drawings, 10 is a base plate that is supported upon three short legs of which two legs, 11, 11, are adjustable so that the base plate may be accurately positioned in a horizontal plane. Rising from opposite sides of the base plate 10, substantially medially thereof, are standards or brackets 12, 12 that support a tubular metal sleeve 13, the latter having a collar 14 secured intermediate its ends, which collar is formed with radially extending trunnions 15, 15 that are swiveled in the upper ends of the respective standards 12. Secured to the sleeve 13 and collar 14 is a downwardly extending quadrant 16 that is positioned closely behind one of the standards 12, and has its arcuate portion formed with a series of apertures 17, 17 arranged concentrically of the trunnions 15. The apertures 17 are spaced 5° or 10° apart, and are registerable with an aperture (not shown) in the adjacent standard, and a suitable stud 18 is provided for insertion into the aligned apertures for holding the sleeve 13 in determinate angular position. Immediately above the respective apertures 17 are suitable indicia 19 that denote at what angle the sleeve 13 is disposed when a particular aperture is engaged with the stud 18, the indicia of the said particular aperture being visible through an aperture 20 formed in standard 12 immediately above stud 18. The arrangement is such that the sleeve 13 may be positioned at various angles from vertical and horizontal.

Receivable within the metal sleeve 13 is a tube 22 in which the liquid to be tested is placed. Preferably the tube 22 is of glass to permit easy and thorough cleaning, and the sleeve 13 may be cut away as at 23, 23 so that the tube 22 will be visible therethrough. The tube 22 fits loosely within the sleeve, and is restrained against movement relatively of the sleeve by means of a spring-pressed pad 24 that is carried by a manually operable stud 25 mounted in the sleeve-collar 14. One end of the tube 22 is closed by a suitable cork or stopper 26, and said stopper abuts a pin 27 extending diametrically across the sleeve at one end thereof, which end is lowermost when the sleeve is disposed in other than horizontal position. The other end of the tube 22 is closed by a stopper 28 that includes means for retaining and releasing a body that is to pass through the liquid in the tube. The stopper 28 comprises a body portion of rubber, wood, or other suitable material upon which is mounted a tubular metal sleeve 29 that extends beyond the inner end of the said body portion, the inner or free end of sleeve 29 having a lune-shaped web 30 thereacross. Telescopically mounted within the projecting portion of sleeve 29 is a cup-shaped metal member 31, the closed end of which is secured to a stem 32 that extends axially through the body portion of the stopper and is provided with a knob exteriorly thereof by means of which member 31 may be manually rotated. The open end of member 31 is formed with lune-shaped web 33 similar to web 30 of sleeve 29. The cup-shaped member 31 constitutes a receptacle for a spherical metal ball 34 that is to pass through the liquid in tube 22, said liquid being designated 35.

The stopper 28 is so mounted in the tube 22 that when the latter is disposed in other than vertical position the web 30 of stopper-sleeve 29 is disposed at the upper side of the sleeve. When the cup-shaped member 31 is so angularly positioned that its web 33 is disposed diametrically opposite said web 30, as shown in Figure 1, the space between said webs is too small for the ball 34 to pass therebetween, with the result that said ball is retained within its receptacle. When the latter is rotated angularly by means of its stem 32, its web 33 approaches coincidence with web 30 of sleeve 29, and there is ample space for the ball to pass out of its receptacle, and to move by gravity toward the lower end of the tube 22.

The feature of the ball-releasing stopper described makes it possible always to release the ball at the same point in the tube, thus making for uniformity in the testing of various liquids and in making successive tests of the same liquid. Preferably the tube 22 is filled with sufficient liquid to contact the ball while the latter is in the stopper-receptacle to the end that the ball, when released, will not gain momentum before entering the liquid. An additional function of the stopper is to seal the opening in tube 22 when used for testing volatile liquids or solutions of materials in volatile solvents, without undue evaporation of the materials.

Mounted upon the under side of the sleeve 13 at two determinately spaced apart points thereon are respective magnetic electrical switches generally designated 37 and 38, which switches are identical so that a detail description of one will suffice for both.

As is most clearly shown in Figure 4, the switch 38 comprises an elongate glass bulb or tube 40 that is closed at both ends and is mounted in an open metal clip 41. The latter is affixed to a suitable shelf or support 42 that has one end secured to a pair of parallel depending arms 43, 43 by means of a bolt 44 that extends through respective elongate slots 45 in said arms. The other end of support 42 is secured to one end of a pair of parallel arms 46 by a bolt 47 that extends through slots 48 in the respective arms, the other ends of arms 46 being secured to the arms 43 by a bolt 49 that extends through said slots 45 in said arms. The support 42 is formed with longitudinally extending slots 50 through which both bolts 44 and 47 extend. The arms 43 are secured at their upper ends to a collar 51 that encircles the sleeve 13. The arrangement provides adjustability for the switch 38 by means of which it may be moved toward or away from sleeve 13 and at an angle thereto.

The bulb or tube 40 is formed at one end with a protuberance within which is a small ball of mercury 53 that is retained therein in all positions of the switch by its own surface tension. Extending into the mercury 53 is an electrical conductor wire 54 that extends longitudinally of the tube and projects exteriorly thereof, said wire being supported by the sealed end portion of the tube. A second electrical conductor wire 55 extends through and is supported by the sealed end of the tube 40. Mounted on the inner end of conductor 55 is a volute spring 56, the outermost convolution of which is extended toward that end of the tube that carries the mercury ball 53, there being an angular electrical contact member 57 secured to the free end of said spring, and also a small steel plate 58 that may be influenced by magnetic force. The arrangement is such that under normal conditions the free end of the spring 56 is in the position shown in broken lines in Figure 4, and the contact member 57 is out of contact with the mercury ball 53. The inner end of conductor wire 55 also carries a guide wire 59 that has an end looped about the contact member 57 as shown for preventing lateral movement of the latter. The switches 37, 38 are of standard construction and no novelty is claimed for the switches per se.

For energizing each magnetic switch, respective arcuate permanent magnets 61, 61 are mounted upon the sleeve 13 and secured to the respective collars 51 by suitable clips 62. The magnets 61 extend partly around the sleeve 13 so as to pass between the tube 22 and the switches 37, 38, the wall of the sleeve being cut away between the magnets and tube as shown at 63, Figure 4. The magnets 61 are spaced a determinate distance apart, and in practice the distance of 12 inches has been found quite satisfactory. By means of the switch supports previously described, it is possible to position the switches 37, 38 properly within the magnetic fields of the respective magnets 61, with the result that the member 58 on the free end of volute spring 56 on each switch is drawn against the wall of the tube 40 on the side thereof adjacent the magnet, and the contact member 57 is moved into the mercury ball 53 as is shown in full lines in Figure 4, and thus makes electrical connection between conductor wires 54, 55. Suitable terminal blocks 65, 66 of dielectric material are mounted upon the sleeve 13 and to these blocks extend the various conductors of the electrical wiring of the instrument.

The arrangement described is such that when the ball 34 is released from its receptacle and rolls by gravity down the tube 22 through the liquid 35 therein, it passes in succession through the magnetic fields of the magnets 61 and deflects the magnetic lines of force in said fields with the result that switches 37, 38 are momentarily opened in succession. The lapsed time between the opening of switch 37 and the opening of switch 38 is a function of the viscosity of the liquid 35, and electrically operated means is provided for automatically and accurately measuring said elapsed time, which means is controlled by said switches.

For measuring the time interval between the closing of switches 37, 38, an electric clock 68 is provided, which clock may be mounted upon the base plate 10 as shown. The clock 68 is of known, standard construction and is of the type that employs two hands of which one records seconds and the other records hundredths of a second. The clock comprises a motor that is constantly driven, and an electrically operated clutch for engaging and disengaging the motor with the mechanism for turning the hands. The clock also includes means for restoring both hands thereof to zero after each period of use.

In addition to the elements described, the operation of the instrument requires a conversion unit 70 comprising a step-down transformer and a rectifier, preferably of the copper-oxide type, for normally energizing relay 71 through the electrical circuit which includes a resistance 72. This latter resistance is inserted in the circuit for the purpose of determining the normal energization of the relay 71. The purpose of this resistance is to correct for the variations in electrical characteristics of the conversion unit and relay 71 in order that a predetermined normal energization in relay 71 may be obtained. A suitable condenser 73 of approximately 1 mfd. capacity is connected across the switch 38 to reduce the arc at the contact. These latter elements are in the electrical circuit of the instrument and may be mounted at any convenient place removed from the instrument.

As shown in the wiring diagram, Figure 2, the instrument is operated from a power line 75 of 110 volts A. C. The conversion unit 70 is connected to the power line 75 by conductor wires 76, and delivers electrical current, through conductor wires 77, 78 at 6 volts D. C. Conductor wire 77 extends from the conversion unit 70 to one terminal of relay 71, the magnetic switch 38 being in said conductor 77. Conductor wire 78 extends from transformer 70, through resistor 72, to the other terminal of relay 71. The relay 71 comprises a switch of which the movable member 79 thereof is connected to conductor 77 by means of connection 80. When the relay 71 is energized the switch-member 79 is in contact with the terminal of a conductor wire 81 that extends to one side of the clutch 82 of the clock 68, the other side of said clutch being connected to conductor 78 through the agency of conductor 83. When the relay 71 is de-energized, as shown in the diagram, switch member 79 is biased by a suitable spring against contact with the terminal of a conductor wire 84 that extends to one side of magnetic switch 37, the other side of said switch being connected to conductor 78 through the agency of connection 85. The motor 86 of the clock 68 is connected to the power line 75 by means of conductor wires 87.

The diagram of Figure 2 shows the condition of the device when it is in readiness for the making of a viscosity test. Switches 37, 38 are in series and closed, relay 71 is de-energized, the motor of the clock 68 is running, and the clutch 82 is open so that there is no movement of the hands of the clock. The taking of the test requires only the releasing of the ball 34 from its position in the elevated region of the tube 22. As the ball moves downwardly in the tube it first passes through the magnetic field of the upper magnet 61 and deflects the lines of force thereof so as to permit the opening of switch 37. Current from the conversion unit then passes through relay 71 to energize the same and to move its switch member out of contact with conductor 84 and into contact with conductor 81, with the result that the clutch 82 is energized and closed and causing motor 86 to drive the timing mechanism of the clock 68. This condition obtains until the ball 34 passes through the magnetic field of the lower magnet 61, said ball then causing a repetition of the phenomenon described and effecting the opening of magnetic switch 38. The result is to de-energize relay 71 and cause the several mechanisms to resume their original position as shown, the opening of clutch 82 disconnecting motor 86 from the timing mechanism and stopping the clock. The elapsed time between the opening of the switch 37 and switch 38 will be recorded on the face of the clock.

This completes a cycle of operation, which may be repeated for the purpose of checking results, if desired, it being understood that the clock is restored to zero setting between successive tests. The only limitation to the number of tests that may be made with the same column of liquid is the distance between the stopper 26 and the nearest permanent magnet 61, since it will be apparent that no further tests can be made after the accumulation of balls 34 in the bottom of the tube extends into the magnetic field of said magnet.

Since the tube 22 is symmetrical in shape and open at both ends, it is easily and quickly cleaned. The instrument is applicable for use with liquids of a wide range of viscosities, it gives consistently accurate results, and achieves the other objects set out in the foregoing statement of objects.

Modification may be resorted to without departing from the spirit of the invention or the scope of the appended claims.

What is claimed is:

1. In a viscosimeter, the combination of a receptacle for liquid, a metal ball movable by gravity through said liquid, a closure in the upper end of said receptacle, ball supporting means in said closure, means exteriorly of the receptacle for releasing the ball from said closure, means for establishing magnetic fields at two spaced apart regions in the course of said ball, and means for measuring the time required for the ball to move from one magnetic field to the other.

2. In a viscosimeter, the combination of a receptacle for liquid, a metal ball movable by gravity through said liquid, a stopper inserted at the top of the receptacle for preventing evaporation when a volatile liquid is to be tested, said stopper comprising a compartment for supporting the ball in determinate position at the top of said receptacle, means extending through the stopper to the exterior thereof for opening said compartment to release the ball, means for establishing magnetic fields at two spaced apart regions in the course of said ball, and means for measuring the time required for the ball to move from one magnetic field to the other.

3. In a viscosimeter, the combination of a tubular receptacle for liquid positionable vertically or at an angle thereto, removable stoppers at the respective ends of the tube, the stopper at the upper end thereof comprising a compartment at its inner end, a metal ball movable by gravity through the liquid and mountable in said compartment, means extending axially through said upper stopper, to the top thereof, for opening the bottom of the compartment to release the ball therefrom, and means for measuring the time required for the ball to move between two determinate points as it falls through the liquid to the bottom of the tubular receptacle.

DELBERT C. CLINE.